United States Patent [19]

Snodgrass et al.

[11] Patent Number: 5,164,544
[45] Date of Patent: Nov. 17, 1992

[54] ELECTRIFIED SPACE DIVIDING PANEL

[75] Inventors: H. Keith Snodgrass, E. Grand Rapids; Neil A. Sendler, Alpine Twp., Kent County, both of Mich.

[73] Assignee: Westinghouse Electric Corp., Pittsburgh, Pa.

[21] Appl. No.: 668,837

[22] Filed: Mar. 13, 1991

[51] Int. Cl.$^5$ .............................................. H02G 3/00
[52] U.S. Cl. ........................................ 174/48; 439/215
[58] Field of Search .................... 174/48, 49; 439/215; 160/127, 135

[56] References Cited

U.S. PATENT DOCUMENTS

| | | | |
|---|---|---|---|
| 4,060,294 | 11/1977 | Haworth et al. | 438/215 |
| 4,277,123 | 7/1981 | Haworth et al. | 439/215 |
| 4,278,834 | 7/1981 | Boundy | 174/48 |
| 4,593,505 | 6/1986 | Russell | 52/221 |
| 4,634,212 | 1/1987 | Boundy et al. | 439/535 |
| 4,762,072 | 8/1988 | Boundy et al. | 108/50 |

Primary Examiner—Leo P. Picard
Assistant Examiner—David A. Tone

[57] ABSTRACT

An electrified space dividing panel system having a panel member, a raceway, a modular electrical system disposed in the raceway, and raceway covers for gaining access to the electrical system. The modular electrical system includes a single terminal block having end and side sockets, with first and second electrical receptacles being respectively removably engaged with the end socket and side sockets such that the first and second electrical receptacles are disposed in horizontally spaced side-by-side relation and project outwardly for predetermined like dimensions through receptacle openings in one of the raceway covers. In a preferred embodiment the raceway includes a web having an opening which cooperates with a support ear on the first receptacle during engagement of the first receptacle with an end socket to provide additional lateral support for the first electrical receptacle when an electrical plug is removed therefrom.

6 Claims, 6 Drawing Sheets

ELECTRIFIED SPACE DIVIDING PANEL

TECHNICAL FIELD

The invention relates in general to space dividing open office systems furniture, and more specifically to panels for such systems having modular plug-together electrical wiring.

BACKGROUND ART

Terminal blocks are commercially available for modular plug-together electrical wiring systems suitable for installation in the wire way or raceway of a space dividing panel. One commercially available terminal block, such as that shown in U.S. Pat. No. 4,634,212, which is assigned to the same assignee as the present application, has first and second sockets at each end for receiving connectors of electrical cables, and first and second cavities or sockets on opposite vertical faces or sides for receiving plug-in duplex receptacles. The plug-in receptacles have rear mounted conductor blades which make contact with energized, neutral, and ground conductors in the terminal block, when the receptacle is plugged into one of the side mounted socket cavities.

The first and second sockets at each end of the terminal block are both utilized only when the electrical circuit branches from one panel into two or more additional panels. Otherwise, only one end socket is utilized. Cavities having openings for receiving conductive blades of duplex receptacles are provided on opposite sides of the terminal block so that duplex receptacles may be plugged into the cavities, making duplex receptacles available for use on both sides of the associated space dividing panel, as required.

When two duplex receptacles are required on a side of a space dividing panel, two terminal blocks are provided in the panel with an electrical cable extending between the two terminal blocks. This necessitates the additional cost of a terminal block and electrical cable, as well as the cost of providing mounting means for two terminal blocks in the raceway.

It would be desirable, and it is an object of the present invention, to be able to have two duplex receptacles per panel side, when required, utilizing a single standard commercially available terminal block for receiving side mounted duplex receptacles. This object must be achieved without extension of the receptacles beyond the external face of the associated raceway cover by more than the conventional fraction of an inch. In other words, a quadplex which would simply plug into the duplex receptacle is not desirable because the whole quadplex would be external to the raceway cover, detracting from the appearance of the installation, as well as presenting a bumping problem for vacuum cleaners, and the like. The external quadplex approach would also add an additional frictional electrical connection between the device plugged into the electrical system and a terminal block, increasing electrical losses.

SUMMARY OF THE INVENTION

Briefly, the present invention is a new and improved electrified space dividing panel having a single standard commercially available terminal block of the type which has first and second sockets at each longitudinal end for electrical cables and first and second cavities or sockets on first and second sides, respectively, for receiving duplex receptacles. A new duplex receptacle is provided which will plug into an available end socket of the single terminal block. Only one basic design for the new duplex receptacle need be constructed, designed to plug into a predetermined end of a terminal block, e.g., the new duplex receptacle may be configured to plug into the left hand end of a terminal block, when facing the associated panel, or the right hand end, as desired. For purposes of example, the present application will describe a duplex receptacle for plugging into the left hand end. Thus, when facing a panel on one side thereof, it will plug into the left hand end, and when facing the same panel on the other side it will also plug into the left hand end, relative to one facing the panel. The result is a duplex receptacle plugged into both ends, when both sides of the panel are provided with the additional plug-in receptacle.

This additional duplex receptacle achieves the requisite mounting stability and resistance to movement when an electrical plug is removed therefrom simply by providing one or more openings in a raceway spine or web adjacent each terminal block. The openings in the web add an insignificant cost to each raceway, and yet they enable any raceway having a single terminal block to have the versatility of being able to add a duplex receptacle to each side of the panel, without adding another terminal block. The new duplex receptacle for mounting on one of the two end sockets includes one or more ears which automatically enter the additional opening or openings in the raceway web, with the ears then moving with the receptacle to a position back of the web, during the normal process of plugging in the new duplex receptacle. The new duplex receptacle protrudes through a raceway cover opening to the same extent as the normal duplex receptacle which is plugged into a side cavity of the terminal block, e.g., about 0.080 inch, preserving the desired neat appearance of the raceway without any bothersome energy consuming external projections.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
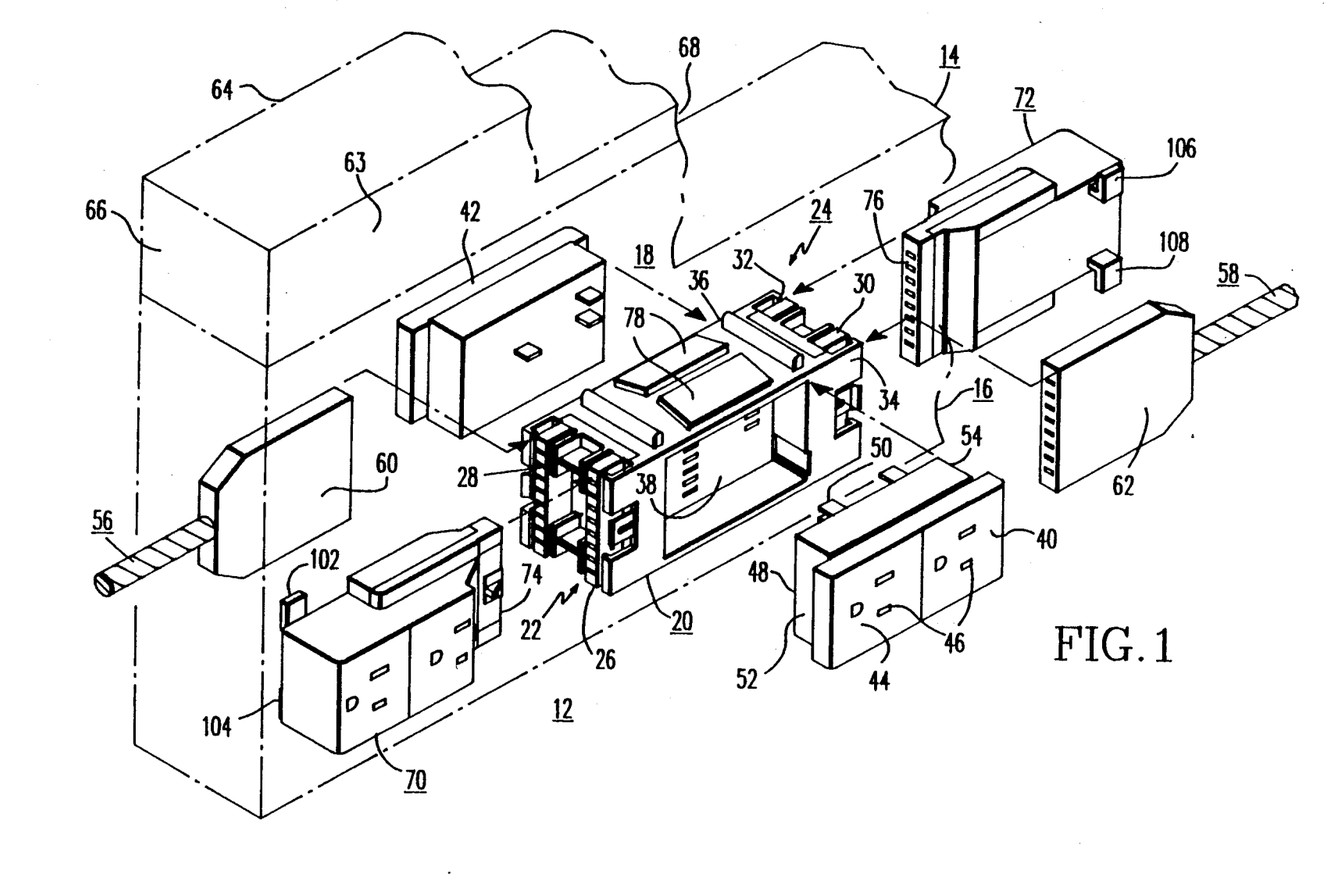
FIG. 1 is a perspective view of an electrified space dividing panel constructed according to the teachings of the invention, with the electrical system being shown exploded and the panel and raceway being shown in phantom.

Referring now to the drawings, and to FIG. 1 in particular, there is shown an electrified space dividing panel system 12 constructed according to the teachings of the invention. Panel system 12 includes a panel member 14, a wire way or raceway 16, and a modular electrical system 18. Panel member 14 may be of any type construction and is thus shown in phantom. The wire way or raceway 16 is shown disposed below the base of the panel member 14, but it may be at any elevation, such as at work surface height, or at the top of the panel member 14. Raceway 16 does not have to be a "raceway" within the technical sense, as armored cables are used, but for convenience it will be hereinafter referred to as raceway 16. Suitable construction for raceway 16 will be hereinafter described.

Figure 9:
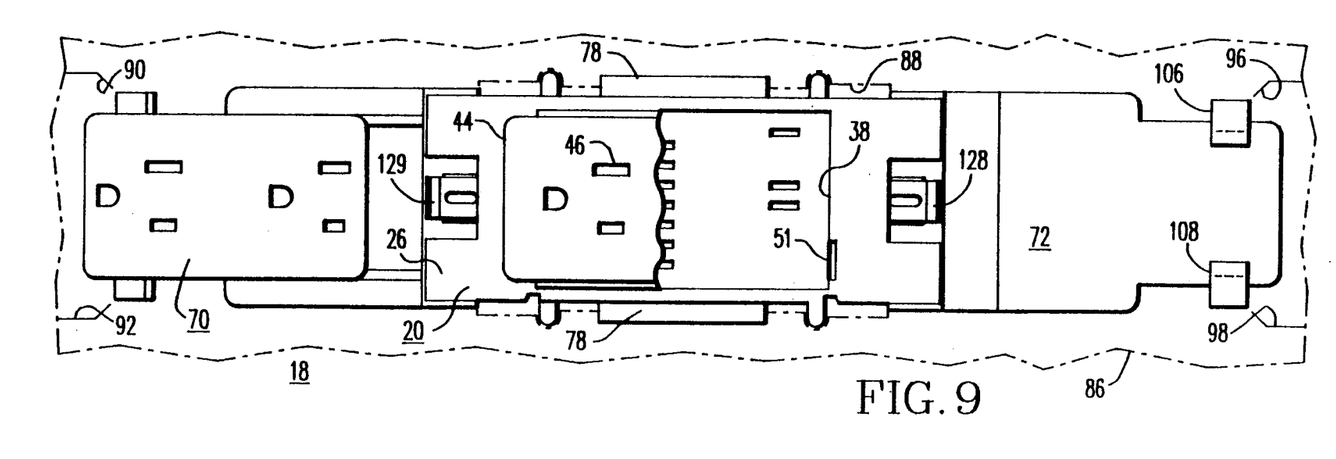
FIG. 9 is an elevational view of the terminal block, side mount receptacles, and rear mount receptacles shown in FIG. 1, except in assembled relation.

Modular electrical system 18 includes a single terminal block 20 per panel, with adjacent panels, if electrified, being of like construction. Terminal block 20 has first and second longitudinal ends 22 and 24, respectively, with the first end 22 having first and second sockets 26 and 28 of like construction, and with the second end 24 having first and second sockets 30 and 32, which are of the same construction as sockets 26 and 28. Terminal block 20 has first and second major, vertically oriented sides 34 and 36, each having a cavity or socket formed therein. The sockets formed in the sides are of like construction, such as socket 38 shown in the first side 34, but they differ in mechanical configuration from the end sockets 26, 28, 30 and 30, with FIG. 9 illustrating an exemplary arrangement for openings in socket 38. The socket in the second side 36, which is not visible in FIG. 1, will be referred to as socket 38', since it is of the same construction as the visible socket 38. Terminal block 20 has a plurality of internal conductors connected to the end sockets 26, 28, 30 and 32 and to the side or lateral sockets 38 and 38'. Terminal block 20 may have six or eight conductive circuits or paths, for example, with three or four of the circuits being energized and the remaining circuits being neutral and ground conductors, as is well known in the art.

Plug-in duplex receptacles 40 and 42 plug into sockets 38 and 38'. Each receptacle 40 and 42, such as receptacle 40, has a front side 44 having two sets of openings 46 for receiving conventional three-prong electrical plugs, and a rear side 48 from which three male terminals 50 extend. Sockets 38 and 38' have a plurality of openings 60 for receiving terminals 50 when receptacles 40 and 42 are plugged into the sockets. Receptacles 40 and 42 are available with their terminals 50 arranged in different patterns to pick up different energized circuits and associated ground and neutral conductors.

Receptacles 40 and 42 have a resilient finger (not shown) at each longitudinal end 52 and 54 which cooperate with grooves within the sockets 38 and 38', such as groove 51 shown in FIG. 9, to releasably secure the receptacles 40 and 42 within the sockets.

To introduce electrical power to terminal block 20, and, when the panel is not the last panel to be energized, to continue electrical power to a similar terminal block in another panel, first and second armored electrical cables 56 and 58 are provided. Cable 56 has like electrical connectors at each end, such as electrical connector 60, and cable 58 has like electrical connectors at each end, such as electrical connector 62. Electrical connectors 60 and 62 are complementary to the end sockets 26, 28, 30 and 32 at the longitudinal ends 22 and 24 of the terminal block.

The terminal block 20, receptacles 40 and 42, and electrical cables 56 and 58 are commercially available, such as from Amp, Inc., Harrisburg, Pa.

Panel member 14 has first and second major flat sides 63 and 64, and first and second ends 66 and 68. When more than one duplex receptacle is required to be installed adjacent to one or both of the major panel sides 63 and 64, it is conventional to provide two terminal blocks 20 in raceway 16, interconnected by an electrical cable similar to cables 56 and 58, with plug-in receptacles similar to receptacles 40 and 42 being plugged into the additional terminal block. The present invention enables two duplex receptacles to be provided per panel side by providing duplex receptacles 70 and 72 having plugs 74 and 76 which are similar in construction to electrical connectors 60 and 62, enabling them to utilize one of the usually vacant end sockets. For example, when an additional duplex receptacle 70 is required adjacent side 63 of panel member 14, connector 60 of cable 56 would be plugged into end socket 28 and plug 74 of receptacle 70 would be plugged into socket 26. In like manner, when an additional duplex receptacle 72 is required adjacent side 64 of panel member 14, connector 62 of cable 58 would be plugged into end socket 30 and plug 76 of receptacle 72 would be plugged into end socket 32. The only time that an additional duplex receptacle 70 or 72 can not be added is when panel 14 adjoins two or more electrified panels. For example, when end 66 of panel member 14 is connected to two or more electrified panels, then duplex receptacle 70 cannot be added, as both end sockets 26 and 28 will be occupied with connectors associated with electrical cables. In like manner, when panel end 68 is connected to two or more electrified panels then duplex receptacle 72 cannot be added. This does not really present a problem, as there will usually be one or more panels close to where additional electrical outlets are desired that can be provided with the two different types of duplex receptacles per panel side.

As described in detail in the hereinbefore mentioned U.S. Pat. No. 4,634,212, terminal block 20 has a pair of spaced flexible tab members 78 on the upper and lower sides thereof which allows terminal block to be snapped into a suitable opening and released with a tool which deflects the tab members. Co-pending application Ser. No. 523,776, filed May 15, 1990, which is assigned to the same assignee as the present application, discloses an extruded plastic raceway having a spine which includes a central vertically oriented web, with an opening for mounting terminal block 20 being formed in the web. Application Ser. No. 523,776 is hereby incorporated into the present application by reference.

Figure 2:
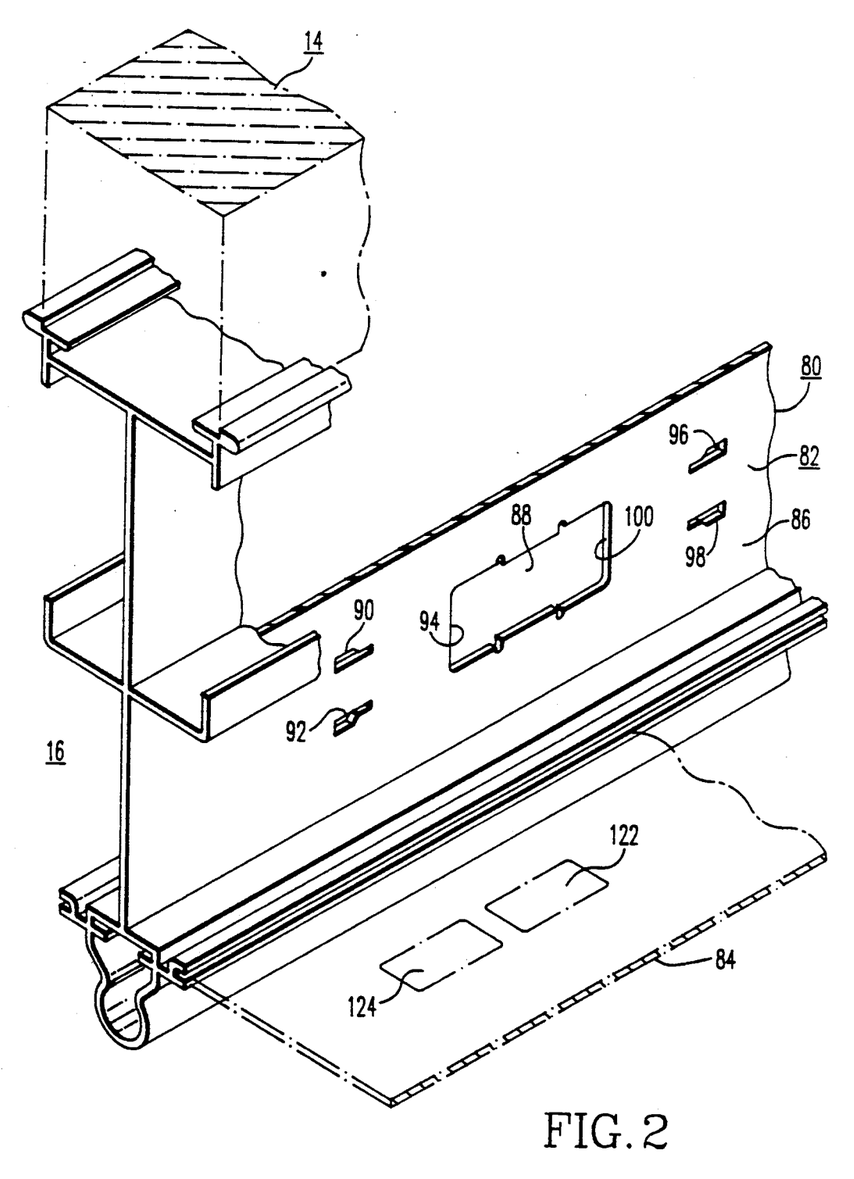
FIG. 2 is a perspective view of a raceway spine formed of plastic which may be used for the raceway shown in phantom in FIG. 1.

FIG. 2 is a perspective view of a raceway assembly 80 formed of plastic which may be used for raceway 16 shown in FIG. 1, with FIG. 2 being similar to FIG. 3 of the aforesaid application Ser. No. 523,776. Raceway assembly 80 includes an extruded plastic raceway spine 82 and an extruded plastic raceway cover for removably enclosing opposite sides of spine 82, such as raceway cover 84, shown in phantom. Spine 82 includes a centrally disposed, vertically oriented web 86 which includes an opening 88 into which terminal block 20 may be mounted. The only modification required to be made to raceway assembly 80 to enable it to accommodate the additional duplex receptacles 70 and 72 is to provide at least one additional opening adjacent each end of opening 88. In the exemplary embodiment of receptacles 70 and 72 shown in FIG. 1, two openings are formed adjacent each end of terminal block opening 88, i.e., openings 90 and 92 adjacent the left-hand edge 94 of opening 88, and openings 96 and 98 adjacent to the right-hand edge 100.

Receptacle 70 is provided with additional lateral support means in the form of upper and lower L-shaped mounting tabs or ears 102 and 104, and in like manner receptacle 72 is provided with upper and lower L-shaped mounting ears 106 and 108. When receptacle 70 is positioned adjacent end socket 26 of terminal block 20 ears 102 and 104 enter openings 90 and 92, respectively, and when receptacle 70 is moved to the right to engage end socket 26, the ears 102 and 104 move behind web 86 as the openings 90 and 92 narrow as they progress towards terminal block opening 88. In like manner, when receptacle 72 is positioned adjacent end socket 32 of terminal block 20 ears 106 and 108 enter openings 96 and 98, respectively, and when receptacle 70 is moved to the left, when viewing FIG. 1, to engage end socket 32, the ears 106 and 108 move behind web 86 as the openings 96 and 98 narrow as they progress towards terminal block opening 88. The ears 102, 104, 106 and 108 are spaced to snugly but slidably accept the thickness of plastic web 86, which may be about 0.080 inch thick, for example.

Figure 3:
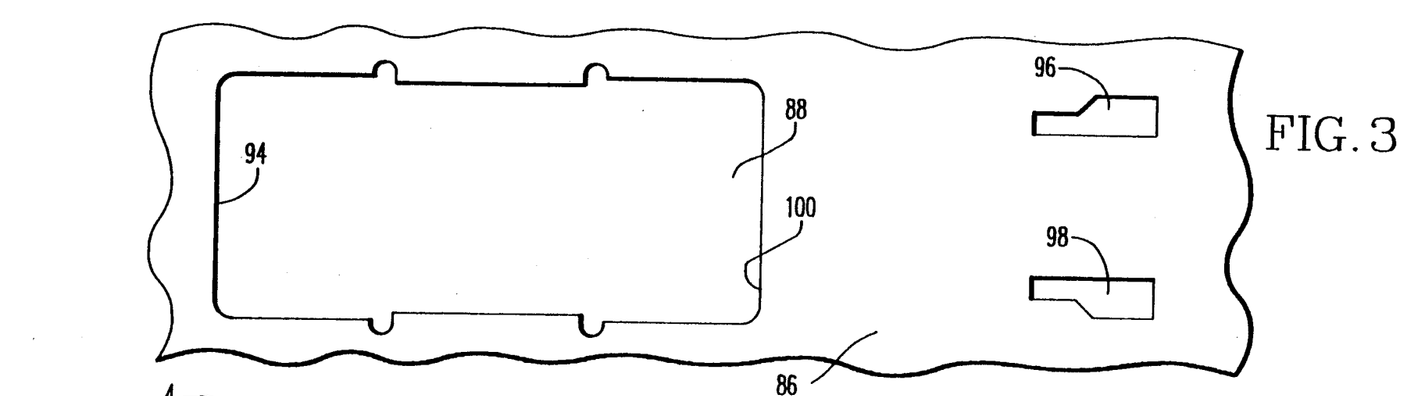
FIG. 3 is an enlarged fragmentary view of a raceway web portion of the plastic spine shown in FIG. 2.
Figure 3A:
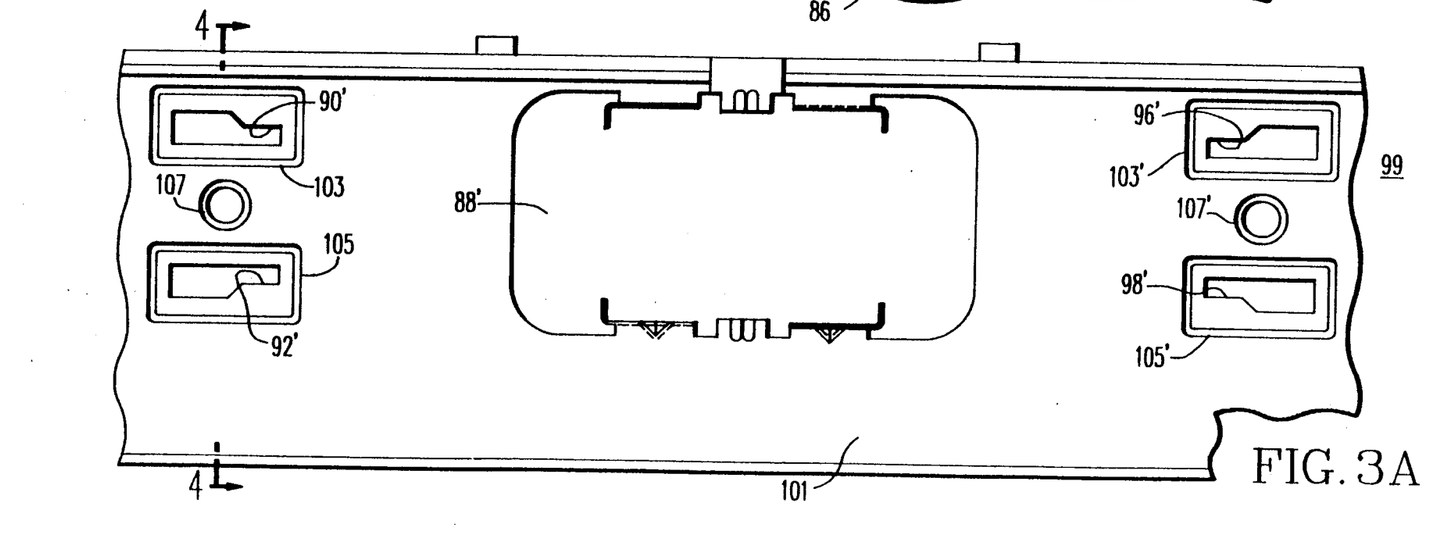
FIG. 3A is a side elevational view of a raceway spine formed of metal, which may be used for the raceway shown in phantom in FIG. 1.

When web 86 is formed of metal, the metal is embossed to provide an effective thickness of 0.080 inch. FIG. 3A is a fragmentary elevational view of a raceway assembly 99 formed of metal, having a web 101 which has openings 88', 90', 92', 96' and 98' which are respectively similar to openings 88, 90, 92, 96 and 98 hereinbefore described relative to plastic web 86. Web 101 is embossed about opening 90', indicated at 103, it is embossed about opening 92', indicated at 105, and it is embossed between openings 90' and 92', indicated at 107. Similar embossments 103', 105' and 107' are associated with openings 96' and 98'.

Figure 4:
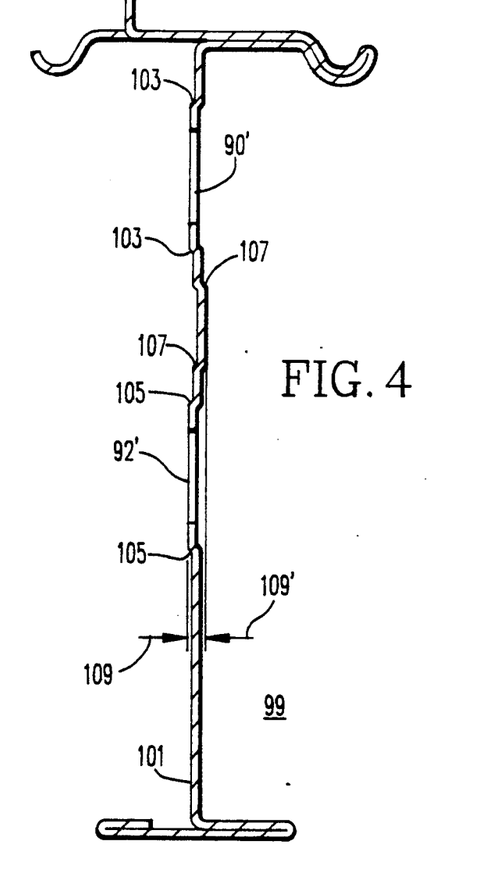
FIG. 4 is an enlarged cross sectional view through the metallic web portion shown in FIG. 3A, taken between and in the direction of arrows 4—4, illustrating an embossing used when the web is constructed of metal instead of plastic.
Figure 5:
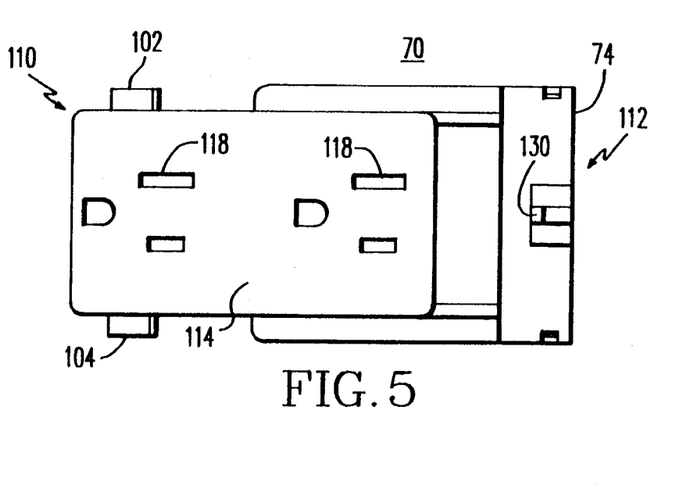
FIG. 5 is an elevational view of the new duplex receptacle shown in FIG. 1 which plugs into an end socket normally used only by an electrical cable.
Figure 6:
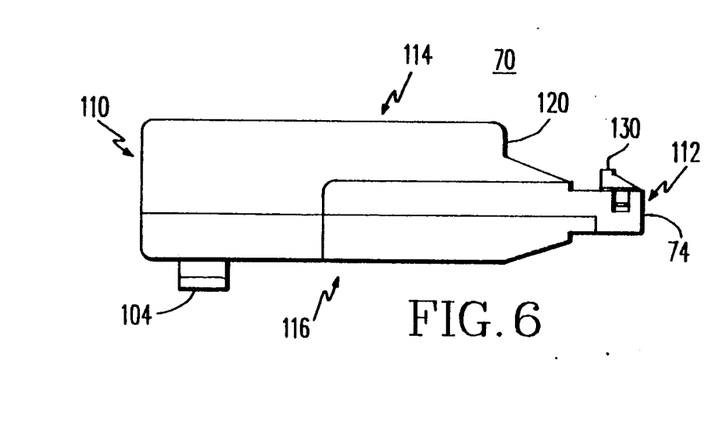
FIG. 6 is a bottom view of the duplex receptacle shown in FIG. 5.
Figure 7:
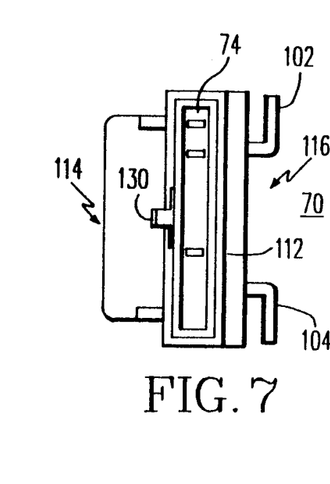
FIG. 7 is a right-hand view of the duplex receptacle shown in FIG. 5.
Figure 8:
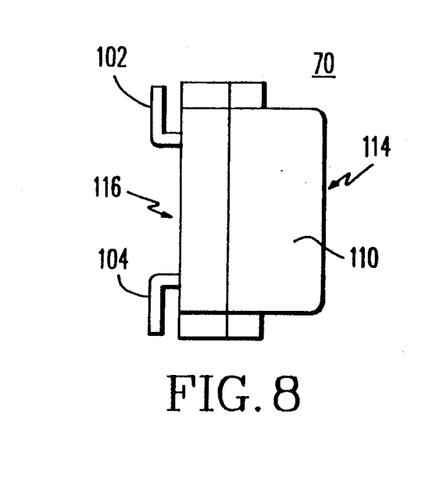
FIG. 8 is a left-hand view of the duplex receptacle shown in FIG. 5.

FIG. 4 is an enlarged cross sectional view through the embossed areas 103, 105 and 107 of FIG. 3A, with the section being taken between and in the direction of arrows 4—4. If the metal is 20 gage steel (0.036 inch), for example, areas 103 and 105 would be embossed outwardly in a common direction for 0.022 inch, and area 107 would be embossed outwardly in the opposite direction for 0.022 inch, making a total effective thickness dimension, indicated between arrows 109-109' in FIG. 4, of 0.080 inch.

FIGS. 5, 6, 7 and 8 illustrate front, bottom, right and left-hand views, respectively, of duplex receptacle 70, with receptacle 72 being of like construction. Receptacles 70 and 72 may be constructed to pick up the same, or different energized conductors within terminal block 20, as desired. Receptacle 70 has first and second longitudinal ends 110 and 112, a front side 114, and a back or rear side 116. The hereinbefore mentioned plug 74 is at the second longitudinal end 112. The front side 114 includes two sets of openings 118 for receiving standard three-prong electrical plugs. The dimensions and configuration of a projection 120 which contains openings 118, best shown in FIG. 6, may be the same as, or different than, the dimensions and configuration of the front side 44 of the standard receptacles 40 and 42, as desired. As shown in phantom in FIG. 2, two horizontally spaced, receptacle receiving knockouts 122 and 124 are provided in each raceway cover, such as cover 84 shown in FIG. 2, and covers 84 and 84' shown in FIGS. 10 and 11. Both types of receptacles, the end mount and the rear mount, extend through the openings provided by the knockouts 122 and 124 for the same dimension, such a 0.80 inch, for example.

Figure 10:
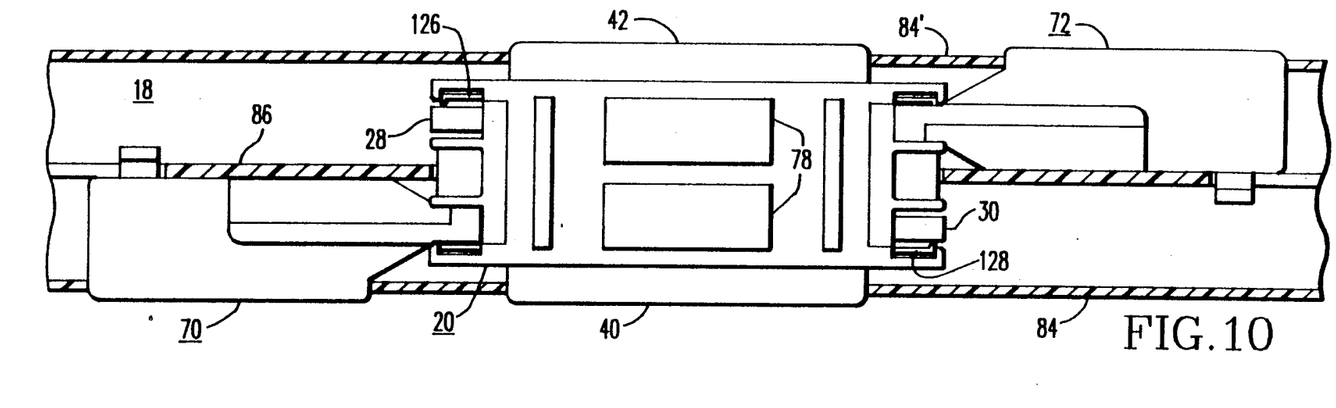
FIG. 10 is a plan view of the assembly shown in FIG. 9.
Figure 11:
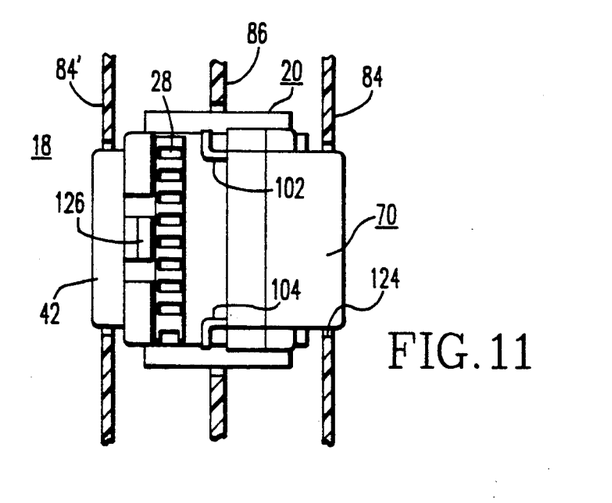
FIG. 11 is an elevational left-end view of the assembly shown in FIG. 9.

FIGS. 9, 10 and 11 illustrate front, top and end views of modular electrical system 18 shown in FIG. 1, except with the receptacles 40, 42 70 and 72 being assembled with terminal block 20. Terminal block 20 includes resilient latches associated with each end socket 26, 28, 30 and 32, for releasably securing plugs 60 and 62 of cables 56 and 58. Certain of these latches are visible in FIG. 10, i.e., a latch 126 associated with end socket 28, and a latch 128 associated With end socket 30. A latch 129 associated with end socket 26, and the hereinbefore mentioned latch 128, are both illustrated in FIG. 9. Receptacle 70 is provided with a projection 130 adjacent the second longitudinal end 112 which cooperates with latch 129.

Receptacles 70 and 72 are securely held in their assembled positions by engagement of plugs 74 and 76 with sockets 26 and 32, by the latches, such as latch 129 which releasably secure the engagements, by the ears 102 and 104 and by the ears 106 and 108, which go behind the web 86 to resist outward forces applied to receptacles 70 and 72 by plug removal, and by the projection of their front faces 114 through the receptacle openings in the raceway covers 84 and 84', such as opening 124 shown in FIGS. 2 and 11.

While two openings 90 and 92 are disposed in web 86 for providing lateral stability for receptacle 70, and two openings 96 and 98 provide the same stability for receptacle 72, it is to be understood that a single opening may be used. For example, a single centrally located projection may be provided on the back side of each receptacle 70 and 72 which has a T-shaped cross section, with the T configuration being oriented on its side. The single opening would also be T-shaped and oriented on its side, such that the two lobes or ears of the T-configuration enter the large end of the T-shaped opening as the receptacles are placed in position to engage an end socket.

We claim:

1. An electrified space dividing panel system, comprising:
   a panel member having first and second major sides and first and second ends,
   a raceway in said panel member extending between the first and second ends, with said raceway having first and second raceway covers which provide access to said raceway,
   at least first and second receptacle openings in said first raceway cover disposed in horizontally spaced side-by-side relation,
   a modular electrical system in said raceway,
   said modular electrical system having a single terminal block, said terminal block having first and second longitudinal ends, first and second major, vertically oriented sides, first and second pairs of end sockets respectively disposed at the first and second ends, first and second lateral sockets respectively disposed in the first and second sides, and a plurality of electrical conductors connected to said first and second pairs of end sockets and to said first and second lateral sockets, at least first and second electrical receptacles, said first electrical receptacle being removably engaged with an end socket of said first pair of sockets, said second electrical receptacle being removably engaged with the first lateral socket, said first and second electrical receptacles projecting for predetermined like dimensions through the first and second receptacle openings in said first raceway cover, and at least one electrical cable having an electrical connector engaged with an end socket of the terminal block.

2. The electrified space dividing panel system of claim 1 wherein the second raceway cover has first and second receptacle openings disposed in horizontally spaced side-by-side relation, and including third and fourth electrical receptacles respectively engaged with an end socket of the second pair of end sockets and with the second lateral socket, said third and fourth electrical receptacles projecting for predetermined like dimensions through the first and second receptacle openings in the second raceway, cover.

3. The electrified space dividing panel system of claim 2 wherein the raceway includes a center spine having a web defined opening in which the terminal block is mounted, and at least first and second additional openings in said web, with the first and third electrical receptacles each having support means which cooperates with said web via said first and second additional openings, respectively, to provide lateral support for the first and third electrical receptacles when a plug is removed therefrom.

4. The electrified space dividing panel system of claim 3 wherein the first and second additional openings in the raceway web and the support means of the first and second electrical receptacles are cooperatively configured such that the support means of the first and third receptacles respectively enter the first and second additional openings and move behind the raceway web during the plug-in engagement of the first and third electrical receptacles with end sockets.

5. The electrified space dividing panel system of claim 1 wherein the raceway includes a center spine having a web defined opening in which the terminal block is mounted, and at least one additional opening in said web, with the first electrical receptacle having support means which cooperates with said web via said additional opening to provide lateral support for the first electrical receptacle when a plug is removed therefrom.

6. The electrified space dividing panel system of claim 5 wherein the additional opening in the raceway web and the support means are cooperatively configured such that the support means enters the additional opening and moves behind the raceway web during the plug-in engagement of the first receptacle with an end socket.

* * * * *